Jan. 19, 1965    L. PÉRAS    3,165,980
CONTROL DEVICES WITH COAXIAL THROTTLE AND
PRESSURE REDUCER FOR HYDRAULIC BRAKING
SYSTEMS OF VEHICLES
Filed Feb. 4, 1963    3 Sheets-Sheet 3
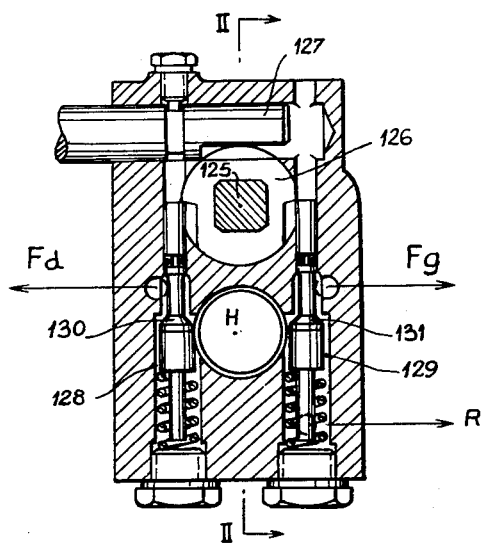
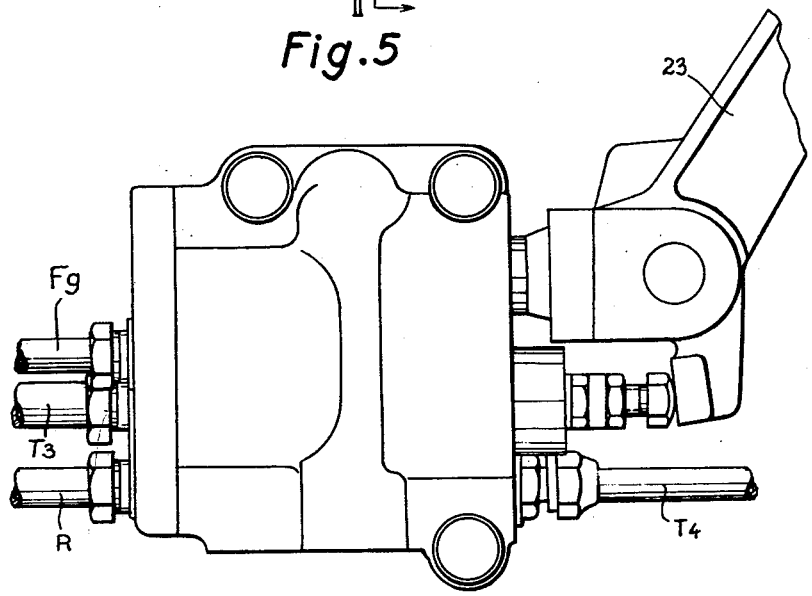
Inventor
Lucien Péras
By Stevens, Davis, Miller & Mosher
Attorneys United States Patent Office 3,165,980
Patented Jan. 19, 1965

3,165,980
CONTROL DEVICES WITH COAXIAL THROTTLE AND PRESSURE REDUCER FOR HYDRAULIC BRAKING SYSTEMS OF VEHICLES
Lucien Péras, Billancourt, France, assignor to Regie Nationale des Usines Renault, Billancourt, France
Filed Feb. 4, 1963, Ser. No. 255,908
Claims priority, application France, Mar. 2, 1962, 889,876, Patent 1,344,879
2 Claims. (Cl. 91—370)

The requirements for introducing a hydraulic servo-action effect in the braking system of a vehicle are easily met by providing a hydraulic circuit of the open-center type, provided that this circuit be completely independent of the other hydraulic apparatus of the vehicle.

However, the same does not apply when it is contemplated to utilize an open-center circuit already existing on the vehicle and designed for controlling devices such as servo-action steering mechanisms or hydraulic jacking systems mounted in series in the circuit. In this case the brake valve is likely to be detrimentally affected by the disturbances resulting from the simultaneous operation of the other apparatus, or to disturb the operation of the other valves disposed upstream and downstream.

In order to avoid these drawbacks the present invention provides a hydraulic control device of which the essential part consists of a self-contained or integral unit comprising on the one hand a throttle valve adapted to increase the fluid pressure in the open-center circuit by throttling the latter under the influence of a mechanical force or a hydraulic thrust, and on the other hand a pressure-reducing valve having the function of taking from the previously pressurized circuit a certain quantity of hydraulic fluid under a pressure proportional to the mechanical force acting upon the valve control member.

The original feature of this invention resides in the fact that in an open-center circuit a pressure reducer normally operating under a constant pressure requiring a closed-center circuit is used, the necessary fluid pressure being delivered, when the device is operated, from a throttle valve, provided however that the fluid pressure prevailing in the circuit at that time is not already equal to or greater than the desired pressure, in which case the pressure reducer operates in the usual manner from this pressure.

This control arrangement is applicable to any other control devices outside the braking control (which, in an open-center circuit, would require a completely self-operating or independent circuitry with respect to the other circuit elements), provided that the total output available be sufficient for ensuring the simultaneous supply of fluid under pressure thereto.

In order to afford a clearer understanding of the invention, two forms of embodiment of the invention will now be described with reference to the accompanying drawings, one form being shown diagrammatically to facilitate the understanding of the basic principles of the invention, the other being a practical embodiment, but it will be readily understood that these forms of embodiment are given by way of example only and should not be construed as limiting the scope of the invention as many modifications and variations may be brought thereto without departing from the spirit thereof.

In the drawings:

FIGURE 3 is a section taken upon the line III—III of FIG. 2;

FIGURE 5 is a side elevational view corresponding to FIG. 2.

Figure 1:
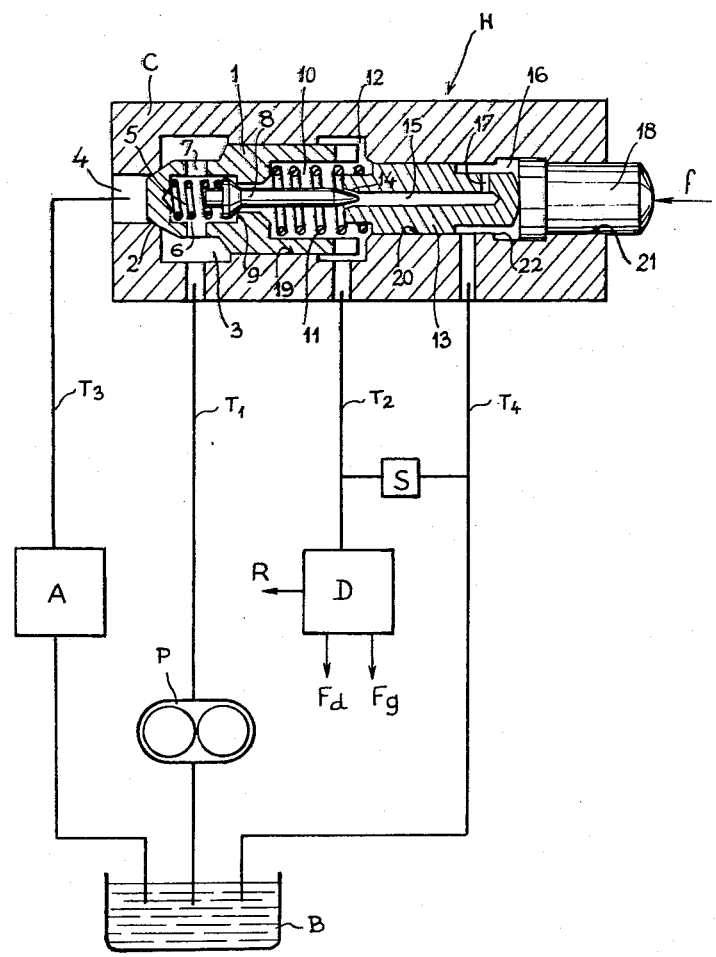
FIGURE 1 is a diagrammatic sectional illustration of the control device of this invention associated with a hydraulic system shown in block form.
Figure 2:
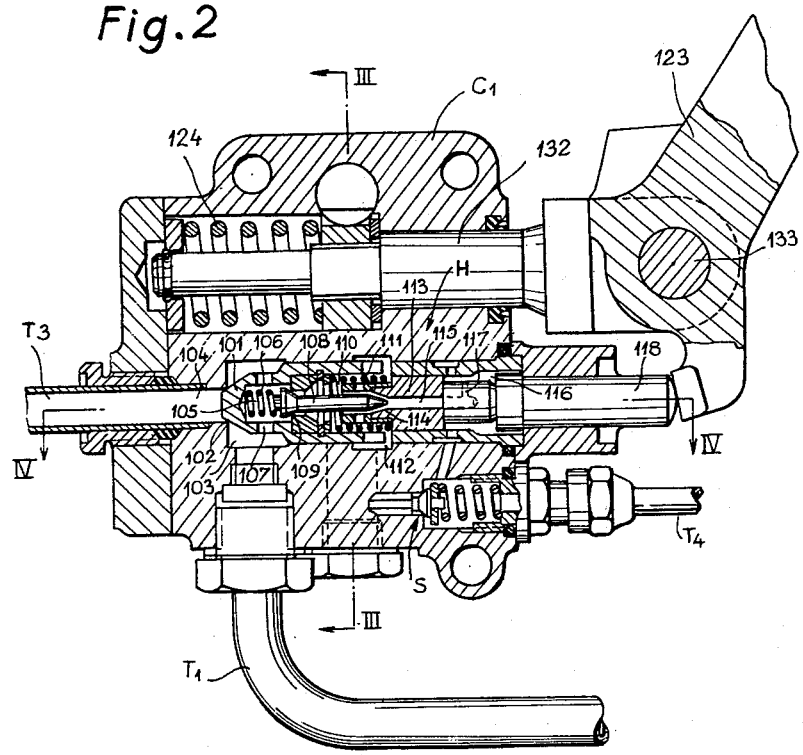
FIGURE 2 is a section taken upon the line II—II of FIG. 3.
Figure 4:
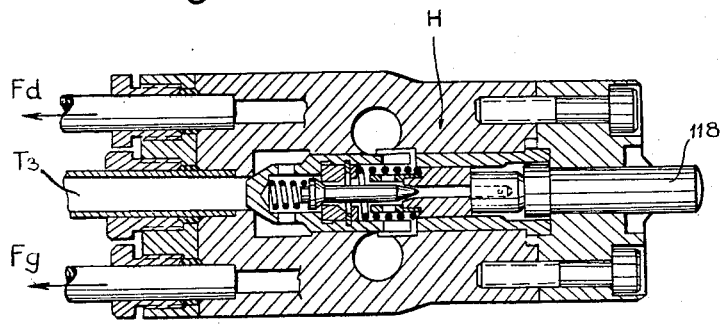
FIGURE 4 is a section taken upon the line IV—IV of FIG. 2.

A device according to this invention, as exemplified in FIG. 1, consists of a control unit H connected through pipe lines to the main load distributor D consisting for example of a braking fluid distributor (adapted for instance to deliver fluid under pressure to a right-hand brake circuit F$d$, a left-hand brake circuit F$g$ and a trailer brake circuit R), an auxiliary load apparatus A, a pump P, a fluid reservoir B and a safety valve S.

The essential part of the invention is the control unit H comprising in a body or block C three valve assemblies arranged in axial alignment. The first valve assembly comprises a movable valve member proper carried by a cylindrical member 1 slidably mounted in a bore 19 of body C, has a stationary seat 2 and separates a chamber 3 connected to the pump P through a pipe line $T_1$ from an end port 4 of a duct $T_3$ connected in turn to the reservoir B through the auxiliary load apparatus A.

The cylindrical member 1 has formed therein on the one hand a chamber 5 connected through radial vent holes or passages 7 to the aforesaid chamber 3, and on the other hand a chamber 10, these two chambers 5 and 10 being interconnected through a passage controlled by another valve member having its head carried by a shank 8, the corresponding valve seat being designated by the reference numeral 9 and the return spring of this valve by the reference numeral 6 (in chamber 5).

On the other hand, chamber 10 encloses a spring 11 urging the member 1 against the seat 2 of the first valve member and reacting on a shoulder of a member 13 formed with a valve seat 14 and slidably mounted in a bore 20 of body C.

This member 13 constitutes the seat of a third valve member having its head carried by a shank 8 and controlling the communication between the chamber 10 and another chamber 16 through a passage 15 and a throttling passage 17. Moreover, the chamber 10 is connected to another chamber 12 connected in turn to the distributor D through a pipe line $T_2$, chamber 16 being connected through another line $T_4$ to the reservoir B.

A push member 18 slidably fitted in a bore 21 in axial alignment with the bores 19 and 20 is resiliently engaged by the member 13 responsive to the coil spring 11.

This push member is adapted to be driven into its bore 21 by an external force $f$ transmitted for instance through the brake pedal.

The valve assembly 1, 2 is a throttling valve adapted to cause the fluid pressure in chamber 3 to rise suddenly, as will be explained presently. The next valve assembly 8, 9 closed in the inoperative position (that is, when the push member 18 is not subjected to any external force) acts as a pressure reducer between chamber 5 and chamber 10. Finally, the third valve assembly 8, 14 normally open in the inoperative condition controls the discharge of distributor D.

The operation of this device is characterized by three specific cases, namely:

(1) Under fully inoperative conditions, that is, when the brake pedal is not depressed and the auxiliary load apparatus A, having a valve of an open center type, is not operated, the fluid pressure is zero in passage 4 (and consequently in pipe line $T_3$), and relatively low in chamber 3 wherein the pressure value depends on the throttling of the hydraulic fluid in valve 1, 2 under the influence of the compression of spring 11.

The distributor D is exhausted through $T_2$, 12, 8–14, 15, 17, 16 and $T_4$. Under these conditions, when the brake pedal is actuated, the sliding member 13 is moved toward chamber 10 and valve 8, 14 will close first, thus cutting off the distributor D from the exhaust; the force f applied on the brake pedal or like control member, which is also transmitted through the spring 11 to member 1, tends to close the valve assembly 1, 2, thus increasing the rate of throttling produced by this valve assembly and therefore determining an instantaneous pressure rise in chamber 3.

After the valve 8, 14 is closed, the sliding member 13 continues its movement to the left as seen in FIG. 1, under the thrust transmitted from the brake pedal, thus unseating the valve member 8 of valve assembly 8, 9. The pressure prevailing in chamber 3 is thus transmitted to chamber 10 and applied to member 1 to increase the thrust applied thereby on its seat 2. As a result, the fluid pressure rises strongly in chamber 3 and is transmitted to the brakes through the valve assembly 8, 9 and chamber 10.

It will be seen that at the same time the pressure is exerted throughout the cross-sectional area of slide valve 13 and tends to move the latter to the right as seen in the figure, thus causing valve 8 to engage its seat 9. But the valve assembly 8, 9 can only close when the effort transmitted from the brake pedal becomes equal to the thrust exerted by the pressure fluid on the sliding seat member 13. As long as the pedal force exceeds this thrust, the fluid pressure rises until it attains the value at which a condition of equilibrium is set up in the double valve member 8 at the limit of its opening position relative to seats 9 and 14. Therefore, the pressure exerted on the brake pedal or like control member is always proportional to the pressure delivered to the brake cylinders.

When the brake pedal is released, the tapered valve seat 14 of valve assembly 14, 8 moves away from its companion valve member 8, and chamber 10 communicates again with the fluid reservoir through 15, 17, 16 and $T_4$. The fluid pressure in chamber 10 drops to zero and the fluid can be discharged freely from the brake cylinders.

When the brake pedal is gradually released, in order to avoid a sudden and therefore detrimental pressure drop in chamber 10 and a premature opening of valve 1, 2, the sliding seat member 13 is so constructed that the hydraulic fluid is returned to the reservoir B through a throttling consisting of the narrow orifice 17 or any other suitable throttling means (such as a needle valve disposed between chamber 16 and pipe line $T_4$).

The maximum value of the fluid pressure in chamber 12 and in the brake cylinders is proportional to the calibration of the safety valve S.

If the force f exceeds the hydraulic thrust applied to sliding member 13, the push member 18 will move to the left as seen in the figure until it engages the stop-forming shoulder 22. This shoulder 22 is also effective for protecting springs 11 and 6 against damage when the brake pedal is depressed with the vehicle at a standstill and zero fluid pressure.

(2) In case the brake pedal were not depressed and the auxiliary apparatus A were operated, the pressure downstream and upstream of valve assembly 1, 2 may exceed the braking pressure before any pedal actuation, as a consequence of the loss of pressure produced by A in the return line $T_3$ to the reservoir.

In this case, when the actuation of the brake pedal opens as before the valve assembly 8, 9 the latter acts as a pressure reducer since it permits the flow of fluid under relatively high pressure from chamber 5 to circuit section 12, $T_2$ and D in which the pressure is restricted by the presence of the safety valve S.

(3) Assuming that the brake pedal is not depressed and that the auxiliary apparatus A is operated, it may happen that the fluid pressure upstream and downstream of valve assembly 1, 2 be relatively high while remaining lower than the normal braking pressure.

In this case, the valve assembly 8, 9, before acting as a pressure reducer, will open to produce in chamber 10 such a pressure that the latter, by acting in the direction to close valve assembly 1, 2, will cause by throttling a complementary loss of pressure whereby a pressure slightly higher than the desired braking pressure will be obtained in chamber 3, due to the differential areas acting on valve assembly 1, 2 in chambers 3 and 10 respectively.

The various component elements of the diagram of FIG. 1 are reproduced in a practical form in FIGS. 2 to 5 of the drawings (wherein the homologous reference numerals are the same plus 100).

This practical embodiment of the invention comprises, in addition, constructional arrangements such as the assembly in a common body $C_1$ of the device H, distributor D and safety valve S, a mechanism for improving the pedal 123 by increasing its stroke, the distributor D being designed as a selector for a farming tractor.

As the permissible stroke of push member 118 controlling the device H is rather short, the pedal operation is improved by pivoting same on a pin 133 carried by a strap having a shank 132 adapted to slide in a bore of body $C_1$, a return spring 124 constantly urging this shank 132 outwards. With this arrangement the pedal stroke is increased considerably and the driver is more liable to sense his effort and to control with greater flexibility the brake control device H.

In this case (i.e. the application of this invention to a farming tractor) the right-hand and left brakes can be applied selectively.

In fact, the chamber 110 in which the braking pressure is built up communicates with bores 128 and 129 (FIG. 3). The spring-loaded valves 130 and 131 mounted in these bores respectively are adapted, when closed, to isolate at will the feed line Fd connected to the right-hand brake or the feed line Fg connected to the left-hand brake, so as to brake only one wheel of the tractor.

The closing of valves 130 and 131 is controlled by means of a cam 126 rigid with a square-sectioned portion 125 of the aforesaid shank 132 on which the pedal 123 is pivotally mounted. Thus, by displacing the brake pedal 123 laterally before depressing same, the driver will be able to select the side on which the brake application is to take place. To this end, the pivot shank 132 is pivotally and slidably mounted in its bore.

A lock member 127 is provided for locking the selector device in the position for applying the brakes simultaneously on both wheels.

An outlet port R (FIG. 3) may be provided for simultaneously applying the hydraulic brakes of a trailer.

Of course, many modifications and variations may be brought to the forms of embodiment shown and described herein, by way of example, without departing from the spirit and scope of the invetnion as set forth in the appended claims.

I claim:
1. In a vehicle having a hydraulic system including a fluid reservoir, a pump, a main load apparatus and an operating means; a central control unit comprising a body member having three coaxial bores, three coaxial valve assemblies mounted in said bores and each having valve members, said bores defining first, second and third chambers, the first valve assembly being a throttling valve disposed between the first and second chambers, an auxiliary load apparatus, conduit means connecting one of said first and second chambers to the fluid reservoir through the auxiliary load apparatus, conduit means conencting the other of said first and second chambers to the pump, the second valve assembly being disposed within the valve member of the first valve assembly and being closed in its inoperative condition, conduit means interconnecting said pump and the main load apparatus through said second valve assembly, a member carrying the valve members of the second and third valve assemblies, said third valve assembly having a slidable seat member, means responsive to the operating means to actuate said seat member, said third valve assembly being in said third chamber and being open in its inoperative position and conduit means connecting said main load apparatus to the fluid reservoir through said third chamber and said third valve assembly.

2. The combination of claim 1 wherein the communication between said main load apparatus and the fluid reservoir through said third valve assembly includes a passage formed in the seat member of said third valve assembly and throttling means provided in said passage.

References Cited by the Examiner
UNITED STATES PATENTS
2,517,005  8/50  MacDuff _____ 60—52 X EDGAR W. GEOGHEGAN, *Primary Examiner.*